United States Patent [19]

Griffen et al.

[11] Patent Number: 5,343,000

[45] Date of Patent: Aug. 30, 1994

[54] MULTIPLE LOAD CELL WEIGHING APPARATUS

[75] Inventors: Neil C. Griffen, Westerville; James F. Million, Worthington, both of Ohio

[73] Assignee: Mettler-Toledo, Inc., Worthington, Ohio

[21] Appl. No.: 994,938

[22] Filed: Dec. 22, 1992

[51] Int. Cl.$^5$ .................. G01G 19/00; G01G 21/24
[52] U.S. Cl. .................. 177/145; 177/255; 177/DIG. 9
[58] Field of Search .................. 177/145, 255, DIG. 9

[56] References Cited

U.S. PATENT DOCUMENTS 4,411,327 10/1983 Lockery et al. .............. 177/DIG. 9
4,881,606 1/1989 Halfon et al. .................. 177/126

Primary Examiner—George H. Miller, Jr.

[57] ABSTRACT

A weighing apparatus employing dual load cells or dual load cell sets is provided with a hinged weigh frame attachment to transmit only vertical load to one load cell or set of load cells and prevent transmission of moments about the longitudinal axis. A ball and dual cup arrangement is connected between the weigh frame and the other load cell or set of load cells to transmit vertical load but prevent the transmission of moments about either the longitudinal or transverse axes of the load cell. Because of the decoupling arrangements, the weighing apparatus requires only longitudinal shift adjustment for only the load cell(s) connected to the hinge.

6 Claims, 4 Drawing Sheets

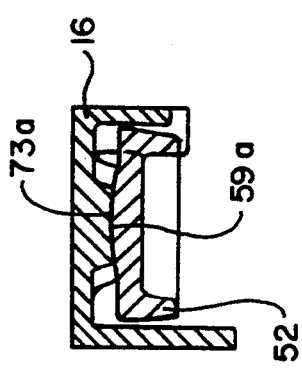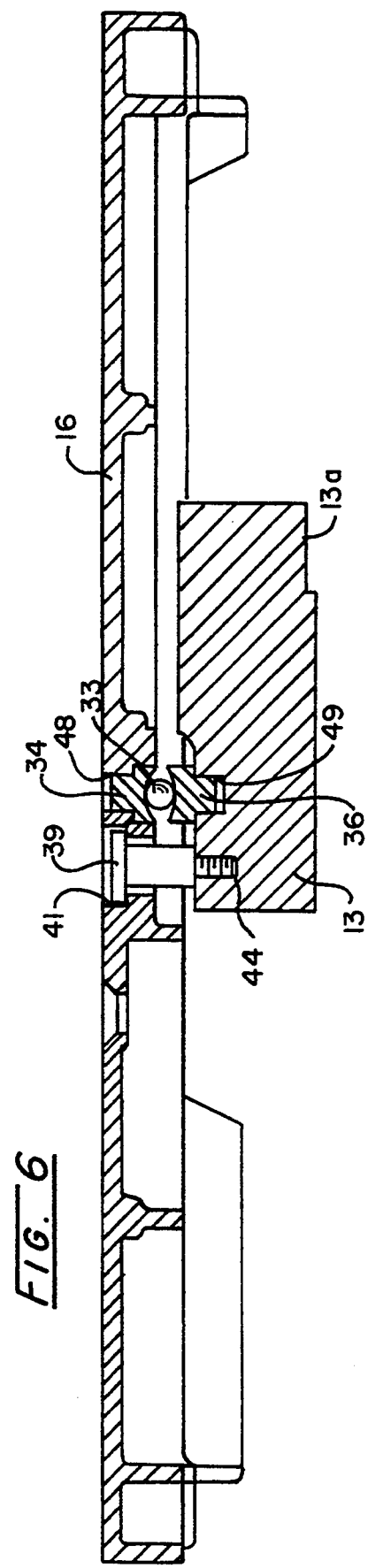

MULTIPLE LOAD CELL WEIGHING APPARATUS

BACKGROUND OF THE INVENTION

This invention relates to a weighing apparatus using two or more load cells and more particularly to such an apparatus having an improved arrangement for reducing the need for load shift adjustment.

Weighing apparatus using multiple load cells are used widely in the weighing industry for weighing loads from a few pounds to many tons. Such weighing apparatus typically includes a base, multiple load cells for producing a signal in accordance with the weight of the load applied, a weigh platter which directly receives the load, and a weigh frame which receives and transfers the load from the weigh platter to the load cells.

Load cells, particularly those employing beams, are typically designed so as to measure a force which is applied to the load cell in a single direction. Problems arise when weight is placed on the weighing apparatus so as to cause components of force to be applied to the load cell in other directions. This typically happens with off center placement of the weight on the weigh platter which give rise to moments and weighing results that vary with load position. These errors may be classified as transverse and longitudinal load position or load shift errors, depending on the placement of the load with respect to the longitudinal axis of the load cell beam. These errors need to be corrected if accurate weight readings are to be obtained.

Typically, each load cell in a weighing apparatus must be corrected for both transverse and longitudinal shift errors. Such correction is referred to as "shift adjust" and the methods of correction typically involve honing of parts of the load cells, or utilization of electrical components such as resistors or of software based mathematical correction of the weight signals. Such methods add a significant expense in parts and labor and complicate the construction of the weighing apparatus, particularly in less expensive apparatus.

SUMMARY OF THE INVENTION

An object of the present invention is to reduce the cost of load shift correcting a weighing apparatus having two or more load cells. A more particular object is to provide such a weighing apparatus which eliminates both transverse and longitudinal shift errors in one load cell or set of load cells, and which eliminates the transverse shift error in the other load cell or set of load cells. The need for shift adjust is thus reduced from all load cells to but one load cell or set of load cells and then only in the longitudinal direction.

According to the present invention, all load cells have longitudinal axes and axes transverse to the longitudinal axes and are rigidly affixed to the base of the weighing apparatus. The first load cell or set of load cells is connected to the weigh frame through a first load transmitting means that transmits the load while preventing the transmission of moments about either of the longitudinal and transverse axes of the first load cell. These cells, therefore, need no shift adjustment whatsoever. The second load cell or set of load cells is connected to the weigh frame through a second load transmitting means that transmits the load while preventing the transmission of moments about the longitudinal axis of the second load cell. These load cell(s) require only longitudinal shift adjustment.

Preferably, the first load transmitting means includes a ball and relatively rotatable double cup arrangement that prevents transmission of moments about either axis of the first load cell and the second load transmitting means includes a hinge member with relatively rotatable arcuate surfaces which prevent the transmission of moments about the longitudinal axis of the second load cell.

By reducing the need to shift adjust all load cells in the weighing apparatus, this invention greatly simplifies the process of shift adjustment in a multiple load cell weighing apparatus.

BRIEF DESCRIPTION OF THE DRAWINGS

FIG. 5 is a vertical sectional view on the line 5—5 of FIG. 1 showing the assembled weigh frame and hinge base.

FIG. 6 is a vertical sectional view on the line 6—6 of FIG. 1 showing the assembled weigh frame and ball-cup assembly.

DESCRIPTION OF A PREFERRED EMBODIMENT

Figure 1:
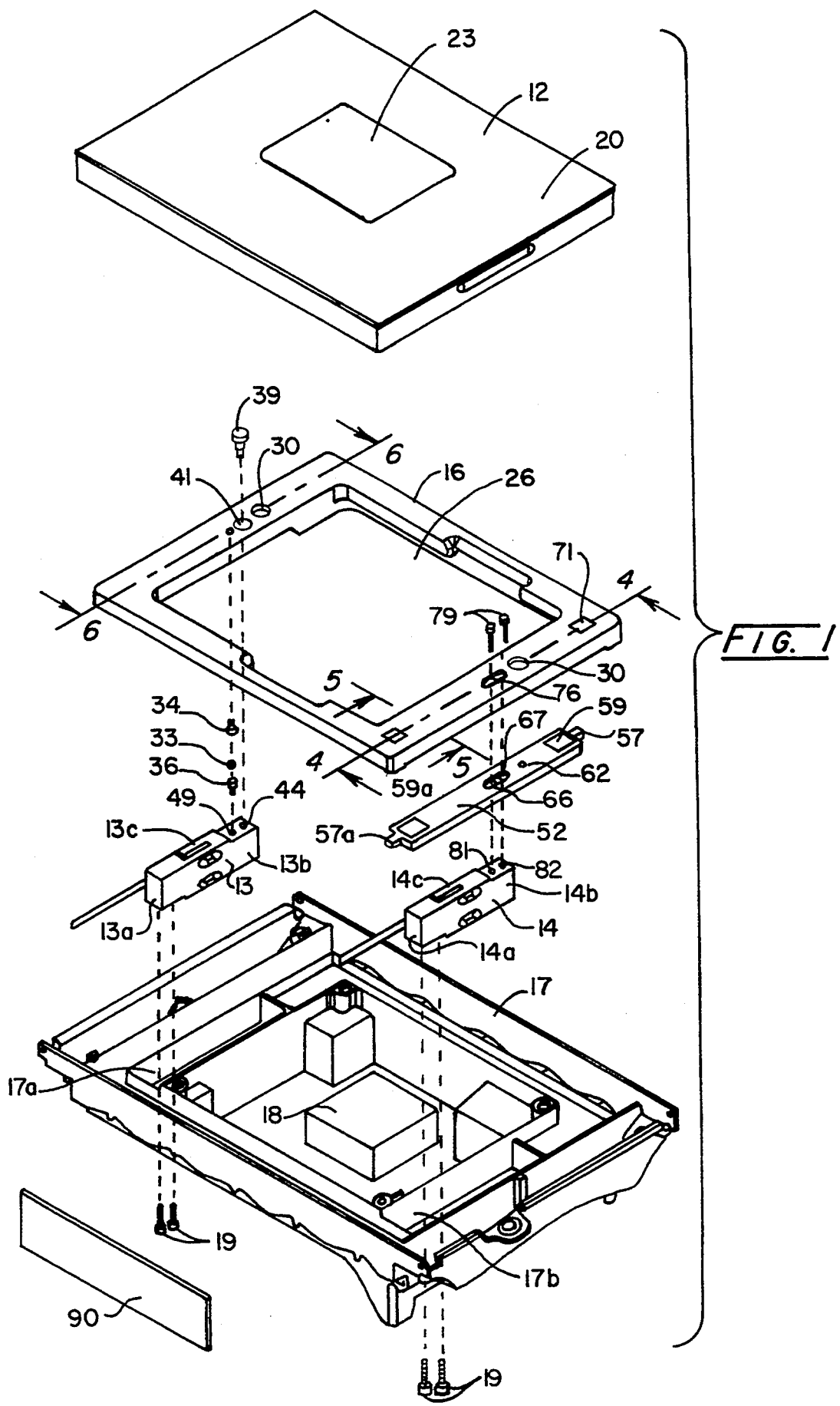
FIG. 1 is an exploded perspective view of weighing apparatus incorporating a preferred embodiment of the present invention.

Referring initially to FIG. 1, there is shown an exploded perspective view of a weighing scale embodying the present invention. The weighing scale includes a weigh platter 12 for receiving the load, a pair of load cells 13, 14, a weigh frame 16 for transmitting the load to the load cells, and a base 17 supporting the load cells and housing electronic portions of the scale. Base 17 also houses a laser scanner, shown diagramatically as block 18, for reading bar codes on items placed on weigh platter 12.

Each load cell 13, 14 is supported within a chamber 17a, 17b, respectively, of base 17 and has a fixed end 13a, 14a, respectively, rigidly attached to base 17 by means of cap screws 19. Each load cell also has a free end 13b, 14b to which a load is applied from weigh platter 12 in a manner to be described below. Each load cell is also provided with strain gauges 13c, 14c. In use, when a load is applied to the free end of the load cells, each will deflect and strain guages 13c, 14c will sense the deflection and provide an analog signal proportional to the load applied. The signal is applied to the scale electronics for various operations such as analog to digital conversion to produce an indication of the weight applied.

Ideally, loads are applied only vertically downward to the free ends of the load cells. In practice, however, the loads will be applied "off center" at various locations on the weigh platter 12 and give rise to moments about the imaginary longitudinal and transverse axes of the load cells. These moments produce "load shift" errors which require compensation. In accordance with this invention, stress in the load cells resulting from these moments is substantially reduced or eliminated by connecting the weigh platter to the load cells in the manner described below.

Weigh platter 12 includes an upper surface 20 upon which the load to be weighed is placed. A light transparent window 23 is formed in upper surface 20 so as to pass laser scanning beams from scanner 18 onto the bar code label of an object on surface 20.

Figure 2:
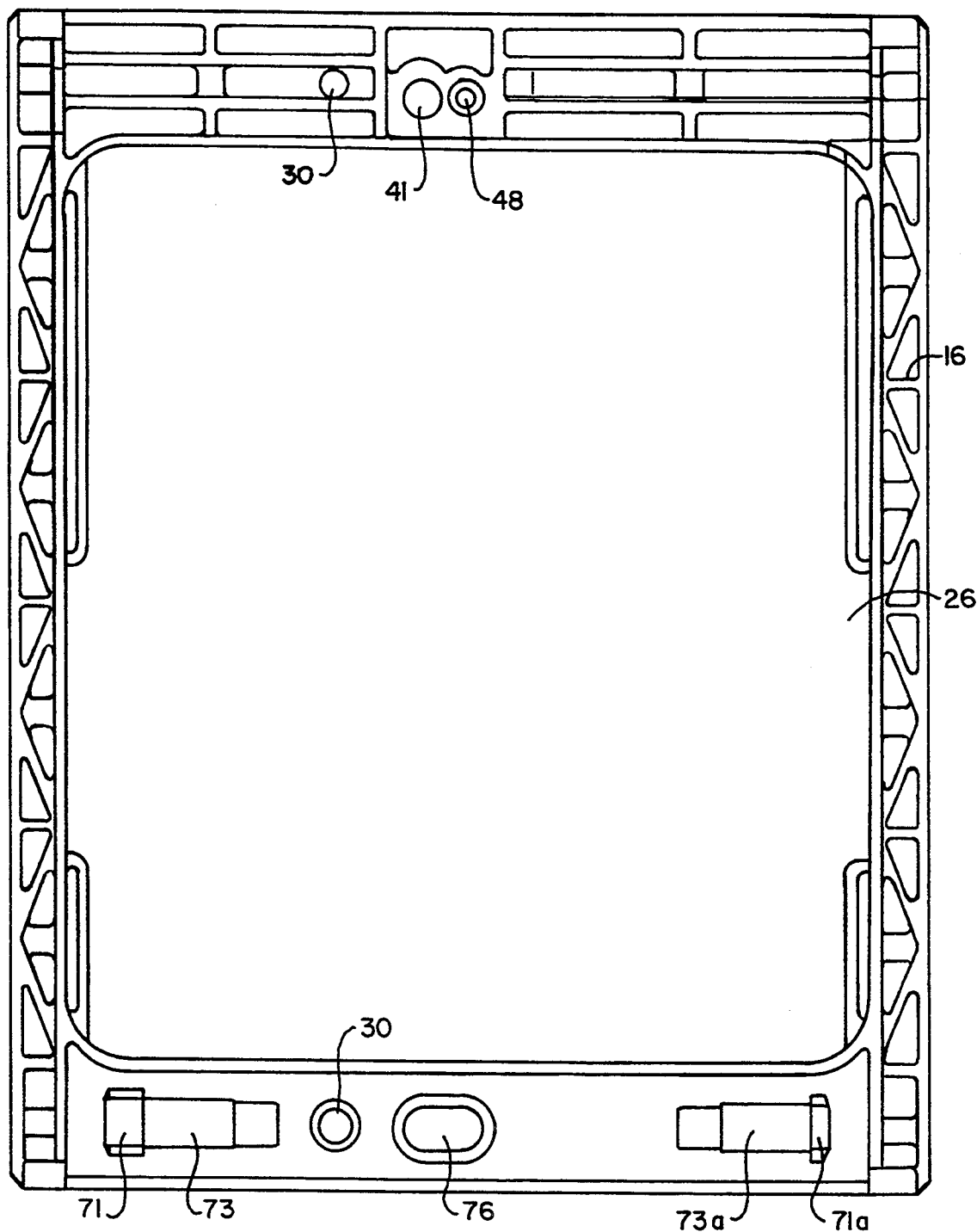
FIG. 2 is a bottom view of the weigh frame of the apparatus shown in FIG. 1.
Figure 3:
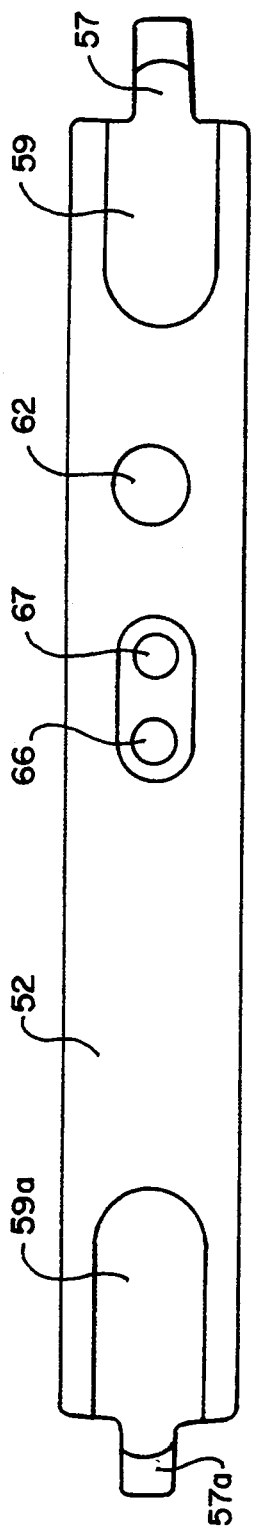
FIG. 3 is a top view of the hinge base of the apparatus shown in FIG. 1.

Weigh frame 16 receives the load to be measured from weigh platter 12 and transmits it to load cells 13, 14. As seen in FIGS. 1 and 2, weigh frame 16 is rectangular with an opening 26 in the center so as to pass laser scanning beams to transparent window 23. Weigh frame 16 is provided with a pair of oppositely spaced holes 30 to receive respective locating pins (not shown) on the underside of weigh platter 12. Weigh platter 12 is thus positioned and constrained onto weigh frame 16.

Weigh frame 16 is connected to and transmits the load to load cell 13 through a ball and double cup assembly. As illustrated in FIG. 1 and 6, ball 33 is captured and retained between cup 34 and cup 36 by means of shoulder screw 39 which projects through shouldered hole 41 in weigh frame 16 and is threaded into tapped hole 44 in load cell 13. Cup 34 is seated in an opening 48 in weigh frame 16 while cup 36 is seated in an opening 49 in load cell 13. As seen in FIG. 6, shoulder screw 39 is sized and positioned such that it constrains weigh frame 16 against lateral movement in any direction by virtue of its relationship to the slightly larger clearance hole 41 in weigh frame 16. The height of shoulder screw 39 also serves to limit the amount weigh frame 16 can be lifted up off ball 33, thereby retaining ball 33 between cups 34 and 36.

Referring again to FIGS. 1 and 6, it can be seen that the portion of cup 34 which fits into cup opening 48 (FIG. 6) of weigh frame 16 is slightly larger than the diameter of opening 48. Cup 34 is thereby rigidly attached to weigh frame 16 by pressing it into opening 48 to secure or capture it therein.

Similarly, the portion of cup 36 which fits into cup opening 49 of load cell 13 is also slightly larger than the diameter of opening 49. Cup 36 is thus rigidly attached to load cell 13 by pressing cup 36 into opening 49 to secure or capture it therein.

By virtue of the point load effect, and the relatively rotatable surfaces of ball 33 and cups 34 and 36, this ball and cup arrangement eliminates all but direct vertical loading on load cell 13. Thus, load cell 13 requires no shift adjustment whatsoever.

Referring now to FIGS. 1 to 5, weigh frame 16 is connected to and transmits the load to load cell 14 through a hinge base 52 connected between the weigh frame and load cell. Hinge base 52 comprises an elongated bar having projecting uplift pins 57, 57a, a pair of upwardly convex surfaces 59, 59a, a locating hole 62 and a centrally located recessed area with two screw receiving openings 66, 67. Uplift pin 57 is slightly longer than uplift pin 57a. For cooperation with hinge base 52, the underside of weigh frame 16 is provided with a pair of uplift loops 71, 71a, a pair of downwardly concave surfaces 73, 73a and a slot 76. Uplift loop 71 is slightly longer than uplift loop 71a.

Figure 4:
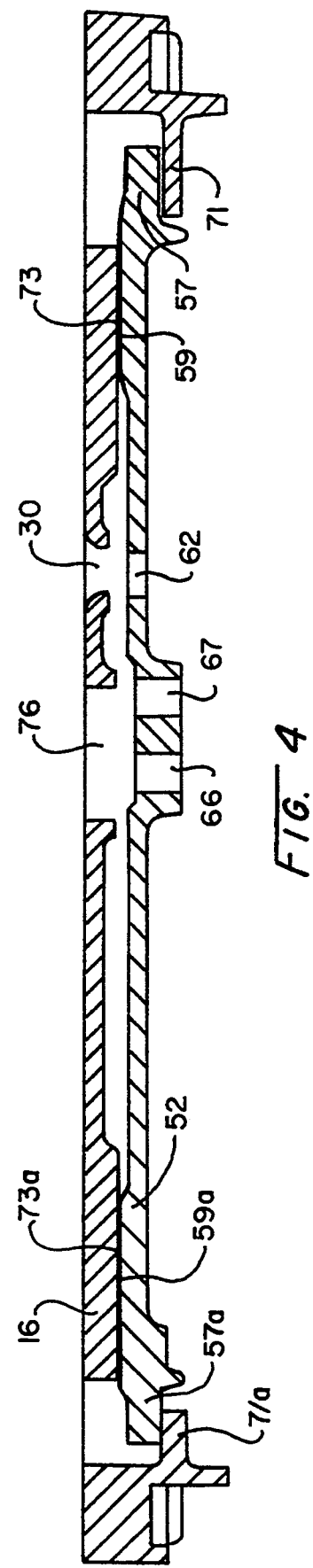
FIG. 4 is a vertical sectional view on the line 4—4 of FIG. 1 showing the assembled weigh frame and hinge base.

As illustrated in FIG. 4, hinge base 52 fits into the underside of weigh frame 16. The difference in length between uplift pin 57 and uplift pin 57a coupled with the difference in length of uplift loops 71 and 71a allows hinge base 52 to be inserted into weigh frame 16 by first inserting the longer uplift pin 57 into its corresponding longer uplift loop 71. Hinge base 52 is further inserted into the longer uplift loop 71 until the shorter uplift pin 57a will clear and can be inserted into the shorter uplift loop 71a of weigh frame 16. Hinge base 52 can then be positioned into weigh frame 16 as shown in FIG. 4 such that the two concave surfaces 73, 73a of weigh frame 16 align with the two convex surfaces 59, 59a of hinge base 52, and the uplift pins 57, 57a are fitted into the respective uplift loops 71, 71a. Locating hole 62 of hinge base 52 is aligned with locating pin hole 30 of weigh frame 16. This prevents the locating pin of weigh platter 12 from contacting hinge base 52 and interfering with the movement of weigh frame 16 in the transverse direction. In this position, weigh frame 16 is prevented from lifting off hinge base 52 when a load is applied on the load cell 13 side of the weighing apparatus, thus serving to help constrain the weigh frame.

As can be seen in FIG. 1, two cap screws 79 are inserted through slot 76 of weigh frame 16 and on through the two screw holes 66, 67 of hinge base 52 and into two tapped holes 81 and 82 of load cell 14 to connect the hinge base rigidly to the load cell. Screw slot 76 is sized and configured so that the heads of cap screws 79 protruding upwardly from holes 66, 67 of hinge base 52 prevent weigh frame 16 from sliding longitudinally relative to hinge base 52 and load cell 14 but permits the weigh frame to move transversely to a limited extent with respect to hinge base 52. This prevents uplift pins 57, 57a of hinge base 52 from disengaging from the uplift loops 71, 71a of weigh frame 16 while not interfering with the movement of weigh frame 16 in the transverse direction.

As shown in FIGS. 1, 4 and 5, the two mating radii formed by the two concave surfaces 73, 73a on weigh frame 16 and the two convex surfaces 59, 59a on hinge base 52 allows the weigh frame to pivot freely about the longitudinal axis of load cell 14. This prevents the transmission of error producing moments and resulting transverse shift error on load cell 14. In order to help set the radii of the hinge mechanism together and thus improve the action and tracking of the hinge action, it has been found useful to make the radii of the two concave surfaces 73, 73a of weigh frame 16 a slightly different length than the radii of the convex surfaces 59, 59a of hinge base 52. It will be appreciated from the foregoing that load cell 14 requires only longitudinal shift adjust. The shift adjust that is required may be performed in a number of ways including mathematical correction of the digital weight signal via software residing in printed circuit board 90 (FIG. 1) which may be attached to base 17 with machine screws (not shown).

Although the apparatus illustrated in the drawings is intended to be used with an optical scanner, the present invention can be used with many different types of multiple load cell weighing apparatus.

What is claimed is:

1. Weighing apparatus comprising, a base, first and second load cells spaced apart and supported by said base, each load cell having a fixed end fastened rigidly to said base and a free end and having a longitudinal axis passing through said fixed and free ends and a transverse axis normal to said longitudinal axis, weight receiving means for receiving a load to be weighed and having a first side and a second side, first load transmitting means connecting the first side of said weight receiving means to the free end of said first load cell to transmit a portion of the weight of said load thereto while preventing the transmission of moments about either of said longitudinal and transverse axes, and second load transmitting means including an elongated member connecting the second side of said weight receiving means to the free end of said second load cell to transmit a portion of the weight of said load thereto while restricting the movement of the weight receiving means in the horizontal and vertical directions, said elongated member including mating surfaces each freely rotatable with respect to the other about an axis parallel to only one of said longitudinal or transverse axes to allow the transmission of moments to said second load cell about one of said axes while preventing the transmission of moments about the other of said axes.

2. Weighing apparatus as claimed in claim 1 wherein said first load transmitting means includes mating surfaces each freely rotatable with respect to the other about axes parallel to said longitudinal and transverse axes to prevent the transmission of moments to said first load cell.

3. Weighing apparatus as claimed in claim 1 wherein said first load transmitting means includes a first cup connected to said weight receiving means, a second cup connected to the free end of said first load cell, and a ball held between said first cup and said second cup to permit free relative angular rotation therebetween and prevent transmission of moments to said first load cell.

4. Weighing apparatus as claimed in claim 1 wherein said second load transmitting means includes an elongated hinge member extending parallel to the longitudinal axis of said second load cell and rigidly connected to the free end thereof, said hinge member having an arcuate surface, said second side of said weight receiving means having a mating arcuate surface freely rotatable with respect to said arcuate surface of said hinge member, whereby relative rotation of said arcuate surfaces prevents transmission of moments about said longitudinal axis of said load cell.

5. Weighing apparatus as claimed in claim 4 wherein said elongated hinge member includes a pair of elongated pins, one at each end, and the underside of said second side of said weight receiving means includes a pair of loops, one at each end, said pins engaging said loops to restrict movement of said weight receiving means in the horizontal and vertical directions.

6. Weighing apparatus as claimed in claim 1 including bar code label scanning means supported by said base and positioned between said first and second spaced apart load cells to direct scanning rays towards an object positioned on said weight receiving means.

* * * * *